US009015602B2

(12) United States Patent
Liu et al.

(10) Patent No.: US 9,015,602 B2
(45) Date of Patent: *Apr. 21, 2015

(54) RESTORING AN OCCLUDED WINDOW IN APPLICATION SHARING SOFTWARE

(75) Inventors: Jun Feng Liu, Beijing (CN); Jin Xin Ying, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 329 days.

This patent is subject to a terminal disclaimer.

(21) Appl. No.: 13/462,301

(22) Filed: May 2, 2012

(65) Prior Publication Data

US 2012/0212506 A1    Aug. 23, 2012

Related U.S. Application Data

(63) Continuation of application No. 12/404,496, filed on Mar. 16, 2009, now Pat. No. 8,196,049.

(30) Foreign Application Priority Data

Mar. 17, 2008    (CN) .......................... 2008 1 0085444

(51) Int. Cl.
  *G06F 3/048*    (2013.01)
  *G09G 5/02*     (2006.01)
  *G06F 9/44*     (2006.01)

(52) U.S. Cl.
  CPC .................................. *G06F 9/4445* (2013.01)

(58) Field of Classification Search
  USPC .................................... 715/751; 345/592, 629
  See application file for complete search history.

(56) References Cited

U.S. PATENT DOCUMENTS

| 5,651,107 | A  | 7/1997  | Frank et al.       |
|-----------|-----|---------|--------------------|
| 5,758,110 | A  | 5/1998  | Boss et al.        |
| 6,429,878 | B1 | 8/2002  | Turek et al.       |
| 6,570,590 | B1 | 5/2003  | Dubrow et al.      |
| 7,028,266 | B2 | 4/2006  | Ben-Shachar et al. |
| 7,483,042 | B1 | 1/2009  | Glen               |
| 7,721,223 | B2 | 5/2010  | Ben-Shachar et al. |
| 2002/0171682 | A1 | 11/2002 | Frank et al.     |
| 2004/0205629 | A1 | 10/2004 | Rosenholtz et al. |
| 2006/0161624 | A1 | 7/2006  | Montgomery et al. |
| 2006/0168533 | A1 | 7/2006  | Yip et al.       |
| 2006/0190826 | A1 | 8/2006  | Montgomery       |
| 2007/0101282 | A1 | 5/2007  | Goossen          |
| 2009/0304269 | A1 | 12/2009 | Willis           |

OTHER PUBLICATIONS

Gyllstrom et al., "Facetop: Integrated semi-transparent video for . . . collaboration", Technical Report TR05-010, Dept of Computer Science, University of North Carolina, May 15, 2005.
Gyllstrom et al., "Techniques for Improving . . . Workspaces", Department of Computer Science, University of North Carolina, Mar. 2007, pp. 425-430.

*Primary Examiner* — Boris Pesin
*Assistant Examiner* — Matthew Ell
(74) *Attorney, Agent, or Firm* — Cantor Colburn LLP

(57) ABSTRACT

A method and apparatus for restoring an occluded window in application sharing. The method includes the steps of: detecting whether an unshared window occludes part of all of a shared window; making the unshared window semitransparent by an alpha blending operation in response to detecting an unshared window that occludes part or all of a shared window; changing the value of the alpha factor in the alpha blending operation, thus obtaining two alpha blended images; and restoring the occluded shared window by using the two alpha blended images.

16 Claims, 5 Drawing Sheets

RESTORING AN OCCLUDED WINDOW IN APPLICATION SHARING SOFTWARE

CROSS REFERENCE TO RELATED APPLICATION

This application is a Continuation Application which claims the benefit of U.S. patent application Ser. No. 12/404,496, filed Mar. 16, 2009, now U.S. Pat. No. 8,196,049, which in turn claims priority under 35 U.S.C. 119 from Chinese Patent Application 200810085444.4, filed Mar. 17, 2008, the entire contents of which are incorporated herein.

BACKGROUND OF THE INVENTION

1. Field of the Invention

The present invention relates to the computer field, particularly to the field of application sharing, and more particularly to a method and apparatus for restoring an occluded window in application sharing.

2. Description of Related Art

Screen sharing is a very important tool in today's collaborative work environments, especially when we have a virtual team and the team members are located in different places. However, due to security or privacy considerations, people seldom elect to share the whole screen, but just share specific applications. Application sharing enables two or more users to work simultaneously and interactively on the same application. In such application sharing, an application is loaded and runs on a computer, and application sharing software allows a window of the application to be displayed on the screen of a remote computer and enables the application to receive operations from a user on the remote computer (client).

Unfortunately, the window of another unshared application often partially covers that of the application being shared. Thus, the occluded part of the application window will not be transferred to the client user, thus bringing inconvenience to the client user. The scenario becomes more severe when the shared application has a dynamic window. The client user will lose a lot of detailed information of the shared application. FIG. 1 shows an example of Microsoft NetMeeting application sharing, in which the occluded part is shown as a mosaic on the computer of the client computer.

There is not yet a good solution to the problem in the art. Most current products such as Microsoft NetMeeting and IBM Lotus Web Conference simply do not display the occluded part. U.S. Pat. No. 5,758,110, entitled "Apparatus and method for application sharing in a graphic user interface", discloses a method for implementing application sharing software, in which is disclosed detecting whether a shared application window is occluded by a unshared application window, and in which, however, the occluded part is also just simply put in a shadow.

U.S. Pat. No. 7,028,266, entitled "Processing Occluded Windows During Application Sharing", proposes a solution to the problem, wherein if the occluded part of the shared application window is less than 30%, then the data of the occluded part are obtained from the latest displayed data; and, if the occluded part of the shared application window is more than 30%, then the method will wait to receive new window information with the occluded part less than 30% within a certain period of time, and if the new window still has an occluded part greater than 30% in the period of time, then a whole window will be constructed from the display data of the most recent window whose occluded part is less than 30%. Obviously, the method is a very imperfect approximate method, since the occluded part from the previous display data may have changed, thus being incapable of representing the current occluded part correctly.

U.S. Pat. No. 6,570,590, entitled "Application sharing in a Frame", discloses a method for sharing an application in a visual window (frame). The patent does not relate to window overlapping, and any window entering the shared frame will be transferred to the remote collaborative user.

SUMMARY OF THE INVENTION

According to an aspect of the present invention, a method for restoring an occluded window in application sharing is provided. The method includes detecting that an unshared window occludes at least part of a shared window and based on said detecting, creating a first alpha blended image using a first value for the alpha factor and creating a second alpha blended image using a second value for the alpha factor. The method further includes restoring the occluded shared window based on the first and second alpha blended images.

According to another aspect of the present invention, apparatus for restoring an occluded window in application sharing is provided. The apparatus includes an occlusion detection module for detecting whether an unshared window occludes part or all of a shared window and an alpha blending execution module for making the unshared window semitransparent by using an alpha blending operation in response to detecting that an unshared window occludes part or all of a shared window. The alpha blending execution module is further configured to obtain two alpha blending images by changing the value of the alpha factor in the alpha blending operation. The apparatus further includes a shared window restoration module for restoring the occluded shared window by using the two alpha blending images.

BRIEF DESCRIPTION OF THE SEVERAL VIEW OF THE DRAWINGS

The invention and a preferred mode of use can be best understood from the following detailed description of the illustrative embodiments when read in conjunction with the drawings, in which.

DETAILED DESCRIPTION OF THE PREFERRED EMBODIMENTS

Embodiments of the present invention include a method for enabling a client user to see a complete shared window when an unshared window occludes a shared window, while the user at the host side can still see the unshared window and operate therein. The method renders the upper unshared window semitransparent by using an alpha blending algorithm. By changing the value of the alpha factor, the application sharing software at the host side can obtain two alpha blending images with different transparencies, and can calculate the occluded shared window through the two alpha blending images by using a restore alpha blending algorithm. Thus the client user can use the shared application normally, without knowing that the window of the shared application has been occluded at the host.

Figure 1:
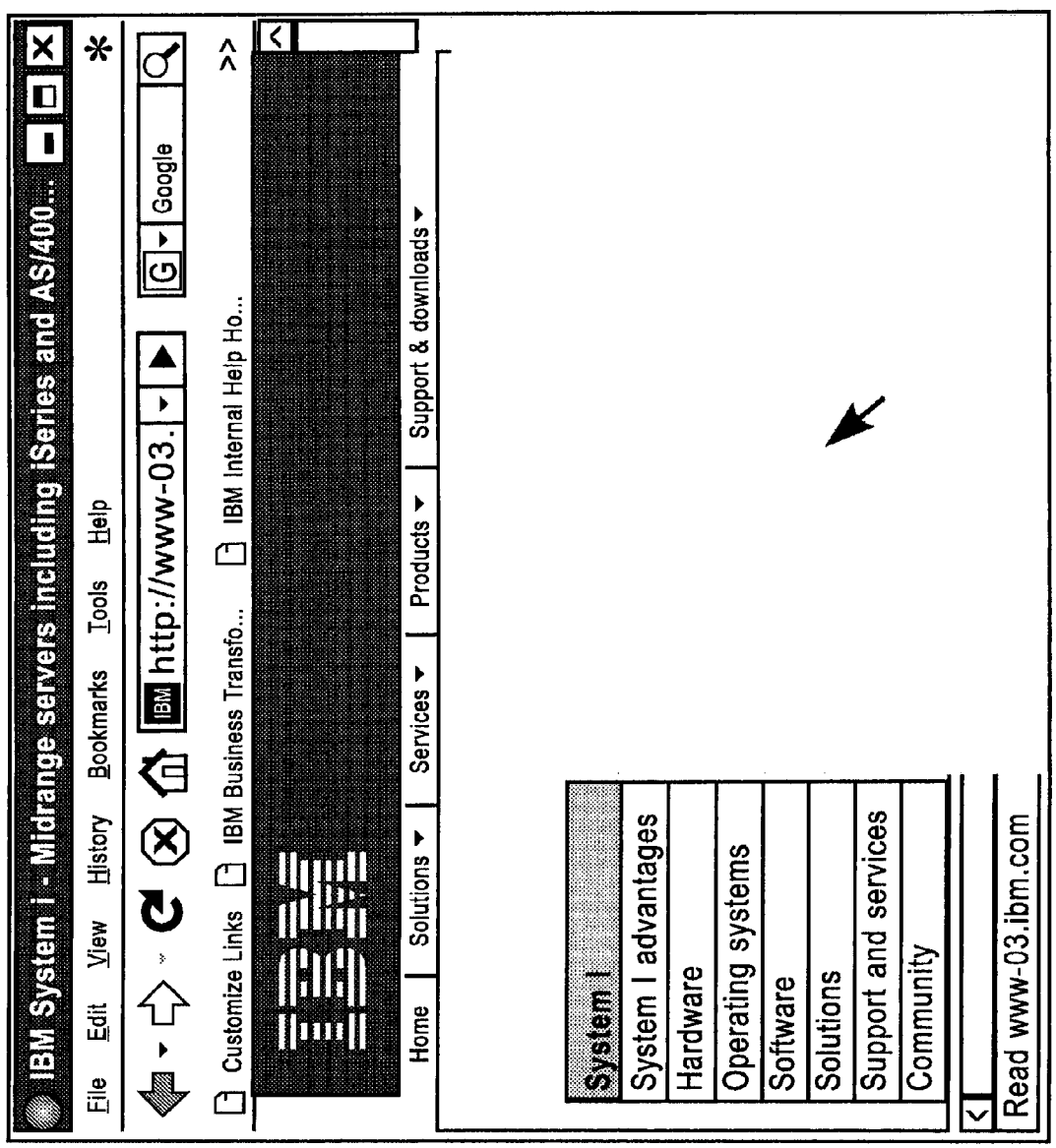
FIG. 1 shows an example of Microsoft NetMeeting application sharing, in which the occluded part is shown as mosaic on a client computer.
Figure 2:
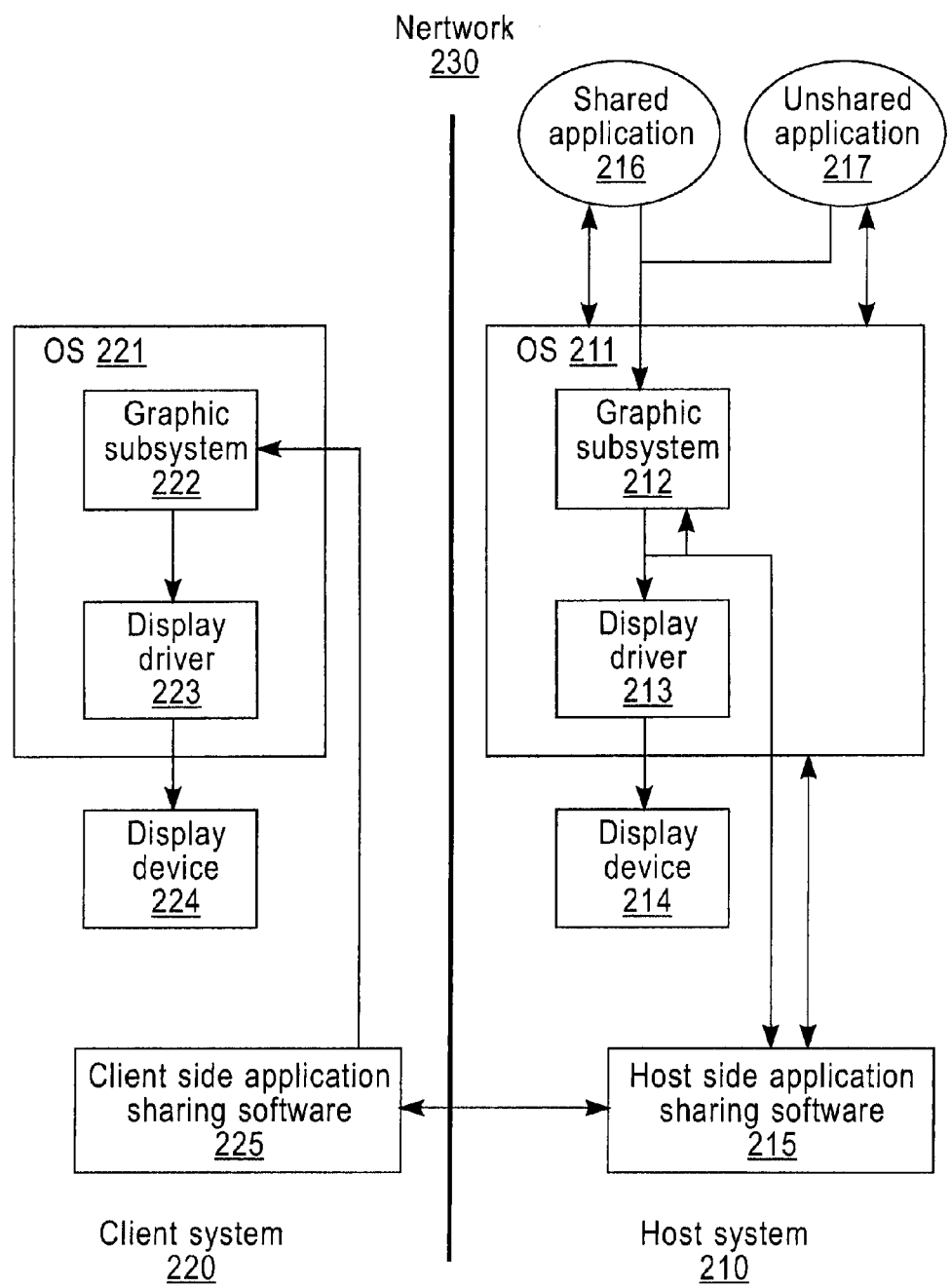
FIG. 2 shows an exemplary execution environment of an application sharing software in which the present invention can be implemented.

Referring to FIG. 2, an exemplary execution environment of an application sharing software in which embodiments of the present invention can be implemented is shown. As shown in the figure, the application sharing software includes host side application sharing software 215 located on a host computer system 210 and client side application sharing software 225 located on a client computer system 220. The host computer system 210 is connected with the client computer system 220 through a network 230. In the present context, the host computer system 210 refers to a computer system providing application sharing to other computer systems in the network, while the client computer system 220 refers to a computer system receiving application sharing provided by another computer in the network. Although only one host computer system 210 and one client computer system 220 are shown in the figure, a host computer system can provide application sharing to any number of client computer systems in the network. In addition, the role of the host computer system and that of the client computer system are interchangeable. That is, the host computer system in a first application sharing session can be a client computer system in a second application sharing session, while the client computer system in the first application sharing session can be a host computer system in the second application sharing session. The host side application sharing software 215 and the client side application sharing software 225 can be either different from each other or identical to each other. The network 230 can be any kind of network such as LAN, WAN, MAN, the Internet and any other tangible or intangible, fixed or temporary computer interconnection mechanism. Further, the network 230 can either be a single network or consist of a plurality of identical types or different types of networks.

The host side application sharing software 215 runs on an OS 211 of the host computer system 210 and interacts with the OS 211. Apart from the host side application sharing software 215, a shared application 216 and an unshared application 217 may also run on the OS 211. Although only one shared application 216 and one unshared application 217 are shown in the figure, a plurality of shared applications 216 and a plurality of unshared applications 217 can run on the OS 211. Similarly, the client side application sharing software 225 runs on the OS 221 of the client computer system 220 and interacts with the OS 221. Apart from the host side application sharing software 215, other applications not shown can also run on the OS 221. The OS's 221, 222 can be any types of OS's such as a Windows series OS, a MAC series OS, a Unix series OS or a Linux OS.

No matter what types, the OS 211, 212 generally includes a graphic subsystem 212, 222, such as GDI in a Windows OS or X Window in a Unix/Linux OS. The graphic subsystem 212, 222 is invoked by an application to generate graphic objects, and send them to output devices such as a display or a printer through a device driver. For example, when an application 216, 217 invokes the graphic subsystem 212 to execute a drawing operation, the graphic subsystem 212 in turn invokes a display driver 213 so as to execute on a display device 214 the actual drawing, such as drawing lines and displaying texts, images and windows. The host side application sharing software 215 can detect when the graphic subsystem 212 invokes the display driver 213, for example, through an intercepting filter disposed between the graphic subsystem 212 and the display driver 213. When detecting that the graphic subsystem 212 invokes the display driver 213, the host side application sharing software 215 intercepts all the information needed for the display driver to execute a drawing operation, and sends the information to the client side application sharing software 225 through the network 230. When the client side application sharing software 225 receives the information needed for a display driver to execute a drawing operation from the host side application sharing software, it invokes the display driver 223, which executes a drawing operation on the display device 224 according to the information, so as to display the window of the shared application 216 on the display device 224, thus realizing the display sharing of the application. Optionally, the client side application sharing software 225 can receive user operations on the application sharing window from an input device (not shown), and send the operations to the host side application sharing software 215. After receiving the user operations, the host side application sharing software 215 invokes corresponding functions in the OS 211, so as to perform the user operations on the shared application 216 running on the OS 211, thus realizing the operation sharing of the application.

FIG. 2 and the above description are only exemplary illustrations of the running environment of application sharing software in which embodiments of the present invention can be implemented as well as the application sharing mechanism. A practical host system and client system can comprise other modules not shown, such as user input devices and network connection facilities, etc. There may exist connection relationships different from those shown in the figure among the application sharing software 215, 225 and the modules of the systems 210, 220. For example, the application sharing software 215, 225 could be connected to the network 230 through a network interface layer in an OS as well as a network interface card, and so on.

Figure 3:
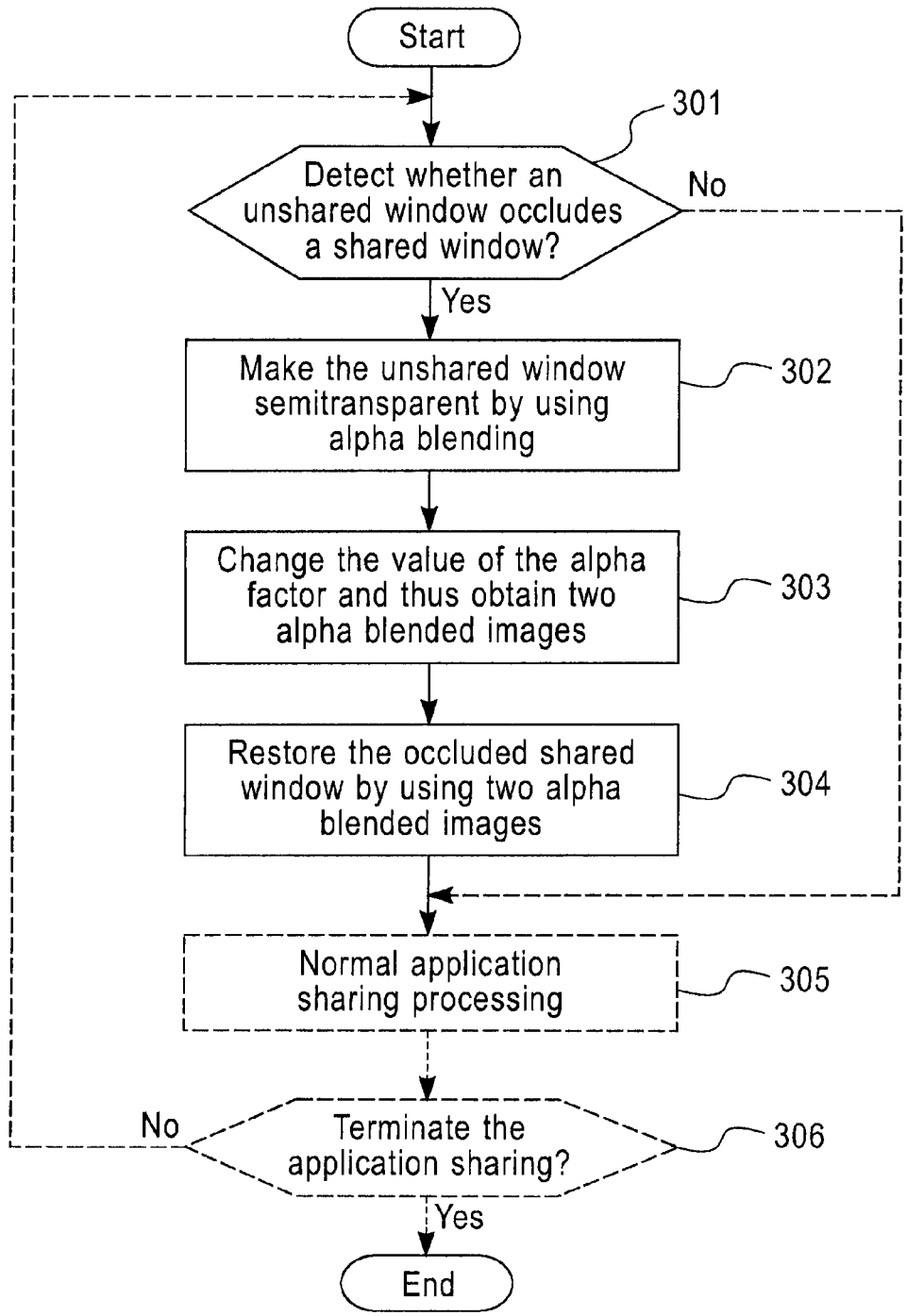
FIG. 3 shows a method for restoring an occluded window in application sharing according to an embodiment of the present invention.

FIG. 3 shows a method for restoring an occluded window in application sharing according to an embodiment of the present invention. The method may be implemented in the host side application sharing software 215 as shown in FIG. 2. The method of FIG. 3 adopts the alpha blending technique, which is a technique for making a covering image transparent known in the computer graphic processing field, and is used for generating a semitransparent view that may be seen through, for example, water or glass. The process obtains an image after transparency processing by assigning a transparent parameter alpha (0<alpha<1) to a displayed image. For example, in an application such as shared window occlusion, if newColor represents the color value of a pixel after alpha blending (such as the RGB value of each pixel), backColor represents the color value of the part (such as the part of a shared window) occluded by an unshared window at the pixel, overlayColor represents the color value of the unshared window at the pixel, and alpha represents an alpha factor with a range being 0<alpha<1, then their relation is:

$$\text{newColor}=\text{backColor}+(\text{overlayColor}-\text{backColor})*\text{alpha} \quad (1)$$

where the alpha blending can be executed either over the whole area of the unshared window, or only over the overlapping area between the unshared window and the shared window.

Most GUI OS's (such as MS Windows and Mac OS, X Windows) provide the alpha blending function. For example, MS Windows OS provides an API for changing an alpha channel through a window handle. So the alpha blending function provided in an OS can be invoked directly to execute alpha blending and change the transparency of the alpha blended image.

In the method for restoring the occluded window in application sharing as shown in FIG. 3, after the process starts, in operation 301, it is detected whether an unshared window occludes, completely or partly, a shared windowy. The detecting operation can be executed using a method known in the art, such as by invoking a window function in a respective OS platform to obtain the position, size and Z-Order of each window on the screen, thus determining whether an unshared window occludes a shared window.

If the result of the determination is No, then the process proceeds to operation 305 to perform normal application sharing processing.

If the result of the determination is "Yes", then the process proceeds to operation 302 to execute an alpha blending operation on the unshared window occluding the shared window, thus making the unshared window semitransparent. The alpha blending operation is executed using formula (1).

The unshared window which has become semitransparent will be displayed on the display of the host. Thus, the user of the host can see the unshared window or operate therein conveniently, and can also see the occluded shared window conveniently.

Next, in operation 303, the alpha factor alpha is changed, thus obtaining two alpha blended images, in which the unshared window will have different transparency. The operation of obtaining two alpha blending images by changing the alpha factor is executed using the following formulas:

$$newColor1 = backColor + (overlayColor - backColor)*alpha1 \quad (2)$$

$$newColor2 = backColor + (overlayColor - backColor)*alpha2 \quad (3)$$

where, backColor represents the original color value of a pixel in the occluded shared window, overlayColor represents the original color value of the unshared window at the pixel, newColor1 represents the color value of the pixel in the first alpha blended image, newColor2 represents the color value of the pixel in the second alpha blended image, alpha1 represents the value of the alpha factor for generating the first alpha blended image, and alpha2 represents the value of the alpha factor for generating the second alpha blended image.

Next, in operation 304, the occluded shared window is restored using the obtained two alpha blended images; that is, the occluded shared window is calculated from the two alpha blended images. In the embodiment of the present invention, the restoration is executed using the following formula, wherein the formula is obtained by multiplying formulas (2) and (3) by alpha2 and alpha1, respectively, and then subjecting them to subtraction:

$$backColor = (newColor1*alpha2 - newColor2*alpha1)/(alpha2 - alpha1) \quad (4)$$

Figure 4:
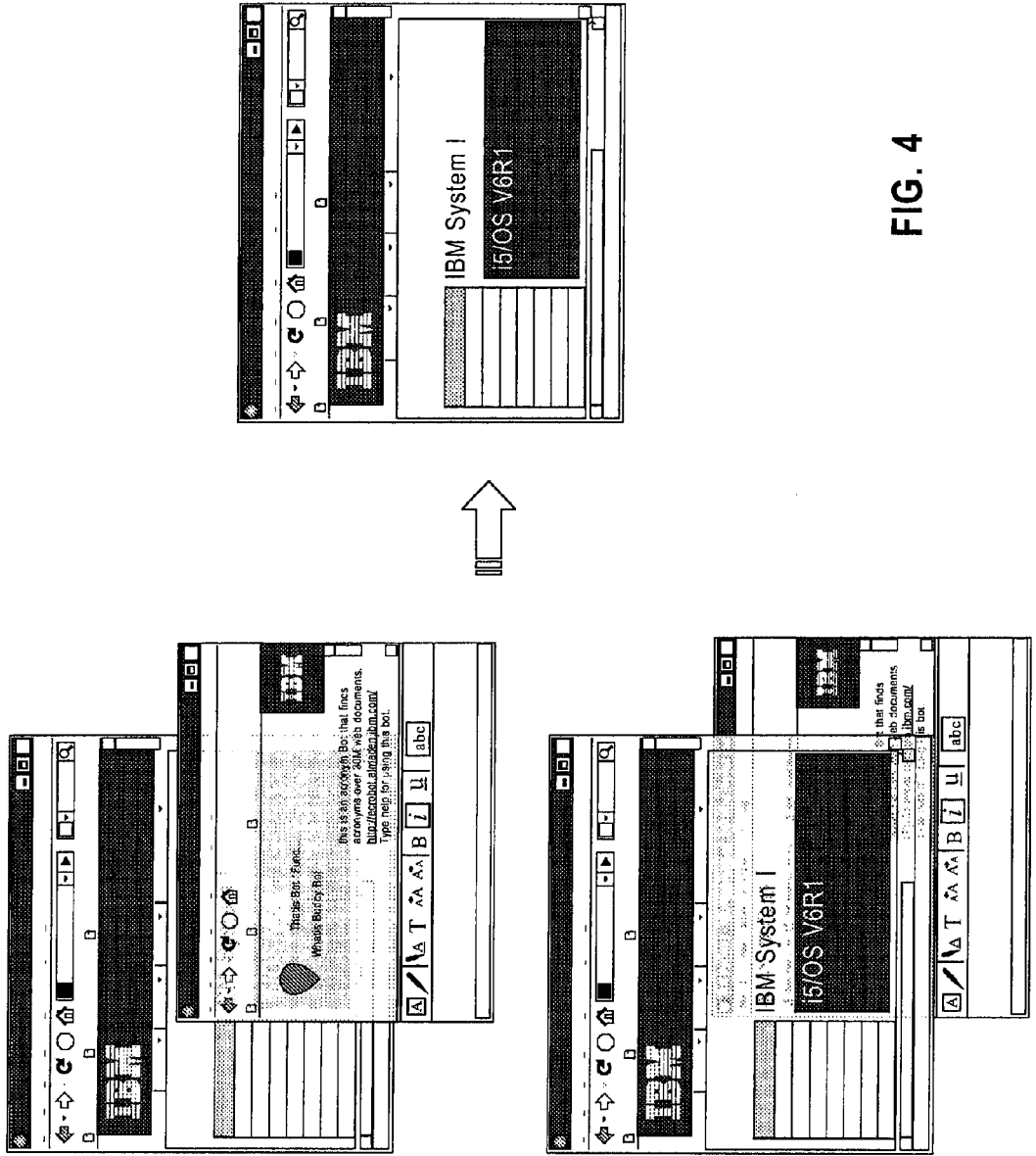
FIG. 4 shows an example of the execution result of the method of the present invention.

FIG. 4 shows an example of the execution result according to an embodiment of the method of the present invention. As shown in the figure, the left part is two alpha blended images generated using different values of the alpha factor, where the unshared window at the top layer has different transparencies in the two alpha blended images. The right part is an image generated by performing operation 304 on the two alpha blended images, where the generated image has eliminated the unshared window at the top layer, and restored the shared window at the bottom layer occluded by the unshared window.

Optionally, the method further includes operation 305, in which normal application sharing processing is performed, for example, sending the restored shared window to the client so as to be shared.

When the application sharing is to be terminated in operation 306 (such as receiving an instruction from the host user for terminating the application sharing), the process ends. Otherwise the process returns to operation 301, and re-executes the operation of the method for restoring the occluded window in the application sharing according to embodiments of the present invention.

FIG. 3 and the above description of the method for restoring the occluded window in application sharing of embodiments of the present invention are illustrative instead of limiting. A method according to embodiments of the present invention can have more, fewer or different operations, and some of the above operations can be merged into a larger operation(s) or divided into smaller operations. For example, operations 302 and 303 can be merged into an operation for obtaining two alpha blended images by using alpha blending. All of these variations fall into the spirit and scope of the present invention.

Figure 5:
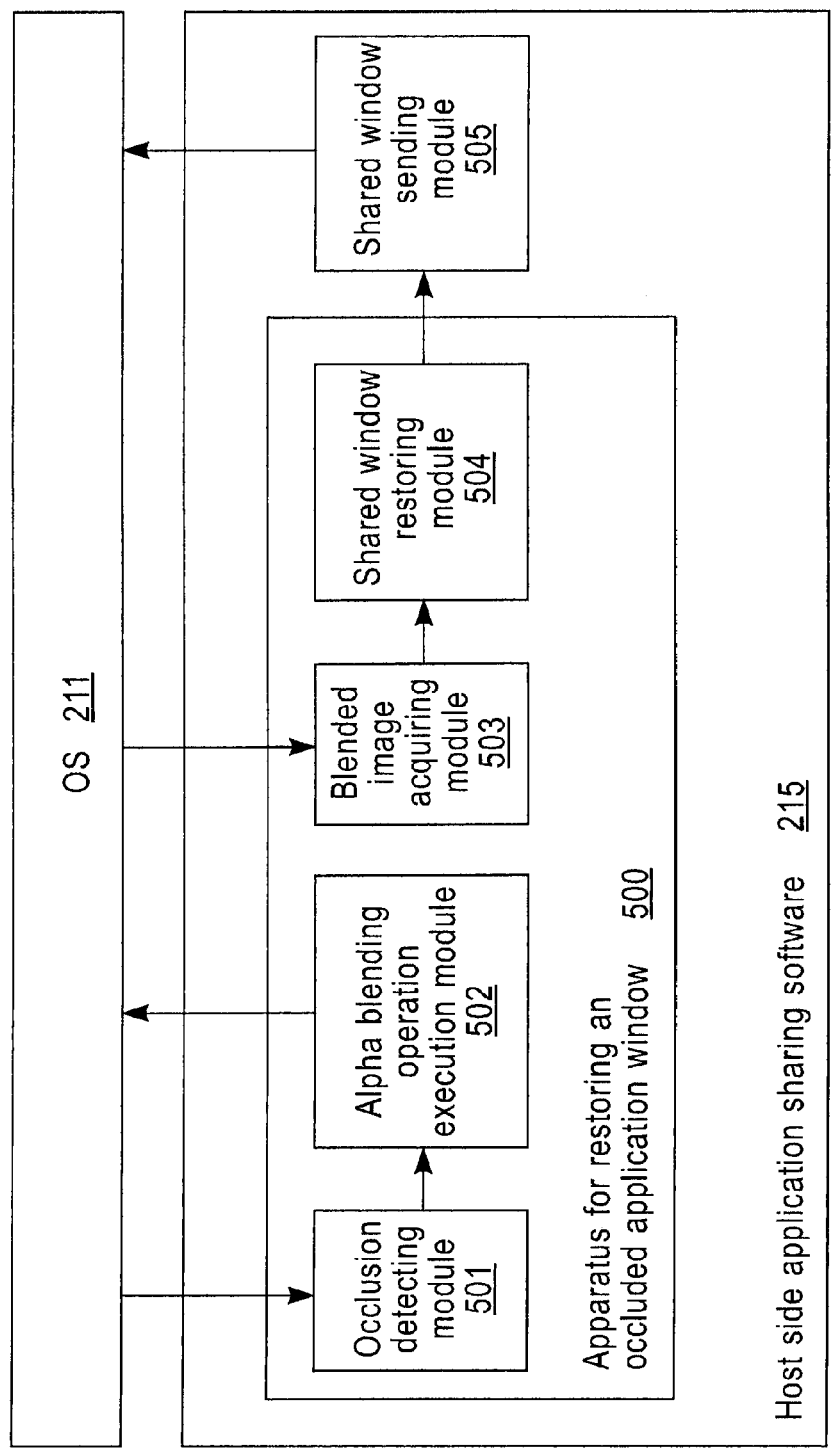
FIG. 5 shows an apparatus for restoring an occluded window in application sharing according to an embodiment of the present invention.

FIG. 5 shows an apparatus 500 for restoring the occluded window in application sharing according to an embodiment of the present invention. The apparatus may be implemented in the host side application sharing software 215 in FIG. 2. As shown in the figure, the apparatus 500 includes an occlusion detection module 501, an alpha blending execution module 502, a blended image acquiring module 503 and a shared window restoration module 504.

The occlusion detection module 501 is used to detect whether an unshared window occludes part or all of a shared window. The occlusion detection module 501 can be a module for detecting the occlusion between windows, and can obtain the position, size and Z-Order of each window on the screen, thus determining whether an unshared window occludes part or all of a shared window.

The alpha blending execution module 502 is used, in response to detecting by the occlusion detection module 501 that an unshared window occludes part or all of an occluded window, to make the unshared window semitransparent using alpha blending, where the alpha blending execution module is further configured to execute alpha blending twice by changing the value of the alpha factor in the alpha blending. In one embodiment, the alpha blending execution module 502 executes the alpha blending by invoking a corresponding window function in the OS 211. The alpha blended image generated by the alpha blending will be displayed on the display 214 by invoking the graphic subsystem 212, and in turn invoking the display driver 214 by the OS 211. Thus the host user can operate simultaneously in the shared window and unshared window displayed in the blended image.

The blended image acquiring module 503 is used to acquire the two alpha blended images obtained from the twice alpha blending operations. In one embodiment, the blended image acquiring module 503 acquires the two alpha blended images obtained from the twice alpha blending operations by intercepting, through an intercepting filter disposed between the graphic subsystem 212 and the display driver 213, the invocation of the display driver 213 by the graphic subsystem 212, and all the information needed for the display driver 213 to execute the drawing operations of the alpha blended images. In one embodiment, the blended image acquiring module 503 is an image acquiring module in application sharing software known in the art.

The shared window restoration module 504 is used to restore the occluded shared window using the two alpha blended images.

In an embodiment of the present invention, the shared window restoration module 504 restores the occluded shared window by using formula (4).

Optionally, the apparatus 500 further comprises a shared window sending module 505 for sending the restored shared window to a remote user so as to be shared by the user.

FIG. 4 and the above description of the apparatus for restoring the occluded window in application sharing of the present invention are illustrative instead of limiting. The apparatus of the present invention can have more, less or different modules and some of the above modules can be merged into a larger module(s) or divided into smaller modules. For example, modules 502 and 503 can be merged into a module for obtaining two alpha blended images through alpha blending operations, and so on. All of these variations fall into the spirit and scope of the present invention.

In another embodiment of the present invention, a method is provided for application sharing, including detecting whether an unshared window occludes part or all of a shared window; making the unshared window semitransparent by using alpha blending when detecting an unshared window occludes part or all of a shared window, and changing the value of the alpha factor in the alpha blending, thus obtaining two alpha blended images. The method further includes restoring the occluded shared window by using the two alpha blended images and sending the restored shared window and other shared windows to a client so as to be shared. For a detailed description of the operations in the method, refer to the above description of corresponding operations in the method for restoring the occluded window in application sharing of embodiments of the present invention, which will not be described here redundantly.

In a further embodiment of the present invention, there is provided an application sharing system which includes an occlusion detection module for detecting whether an unshared window occludes part or all of a shared window and an alpha blending execution module for making the unshared window semitransparent by using alpha blending in response to detecting that an unshared window occludes part or all of a shared window. The alpha blending execution module is further configured to obtain two alpha blended images by changing the value of the alpha factor in the alpha blending. The system includes a shared window restoration module for restoring the occluded window by using the two alpha blended images and a shared window sending module for sending the restored shared window and other shared windows to a remote user so as to be shared. For a detailed description of the modules in the system, refer to the above description of corresponding modules in the apparatus for restoring an occluded window in application sharing of embodiments of the present invention, which will not be described here redundantly.

Embodiments of the present invention can be implemented in hardware, software or a combination thereof. Embodiments of the present invention can be implemented in a computer system in a centralized mode or in a distributed mode in which different components are distributed in a number of interconnected computer systems. Any computer system or other apparatus suitable for executing the methods described herein is applicable. Embodiments of the present invention may be implemented by way of a combination of a computer program and general computer hardware, where when the computer program is loaded and executed, it controls the computer system to execute a method according to an embodiment of the present invention and constitute the apparatus according to an embodiment of the present invention.

Embodiments of the present invention can also be embodied in a computer program product, which comprises all the features enabling the methods described herein to be implemented, and when being loaded into the computer system, can execute the method.

While the present invention has been shown and described with reference to the above-described embodiments, a person skilled in the art can understand that various changes in form and detail can be made thereto without departing from the spirit and scope of the present invention.

The invention claimed is:

1. A method for restoring an occluded window in application sharing, comprising:
  detecting that an unshared window occludes at least part of a shared window;
  based on said detecting,
    (a) creating a first alpha blended image using a first value for the alpha factor; and
    (b) creating a second alpha blended image using a second value for the alpha factor; and
  restoring the occluded shared window based on the first and second alpha blended images by: multiplying first pixel values of first pixels in the first alpha blended image by the second alpha factor to generate a first product, multiplying second pixel values of second pixels in the second alpha blended image corresponding to the first pixels by the first alpha factor to generate a second product, and subtracting the second product from the first product to generate a first difference.

2. The method of claim 1, wherein creating the first alpha image includes making the unshared window semitransparent by a first alpha blending operation, and
  creating the second alpha image includes making the unshared window semitransparent by a second alpha blending operation.

3. The method according to claim 1, further comprising sending the restored shared window to a client so as to be shared.

4. The method according to claim 1, further comprising intercepting from a data stream to a display driver all the information needed for a display driver to execute the first and second alpha blended images.

5. The method according to claim 1, wherein detecting that the unshared window occludes at least part of the shared window includes detecting a position, size and Z-Order of each of the unshared window and the shared window on a screen.

6. An apparatus for restoring an occluded window in application sharing, comprising:
  a host computer system having an operating system that runs host side application sharing software, the host side application sharing software further comprising:
  an occlusion detector for detecting whether an unshared window occludes part or all of a shared window;
  an alpha blender, responsive to the occlusion detector for:
    (a) creating a first alpha blended image by making the unshared window semitransparent using an alpha blending operation using a first value for the alpha factor, and
    (b) creating a second alpha blended image by making the unshared window semitransparent using an alpha blending operation using a second value for the alpha factor; and, a shared window restorer for restoring the occluded shared window by using the two alpha blended images by: multiplication of first pixel values of first pixels in the first alpha blended image by the second alpha factor to generate a first product, multiplication of second pixel values of second pixels in the second alpha blended image corresponding to the first pixels by the first alpha factor to generate a second product, and subtraction of the second product from the first product to generate a first difference.

7. The apparatus according to claim 6, further comprising a shared window sender for sending the restored shared window to a remote user so as to share the shared window with the remote user.

8. The apparatus according to claim 7, wherein the shared window sender is configured to send the restored shared window to the remote user via a network.

9. The apparatus according to claim 6, wherein the alpha blender includes an alpha blending execution module configured to create the first and second alpha blended images, and a blended image acquiring module configured to obtain the first and second alpha blended images and to transmit the first and second alpha blended images to the shared window restorer.

10. The apparatus according to claim 9, wherein the blended image acquiring module includes an intercepting filter configured to intercept all the information needed for a display driver to execute the alpha blended images.

11. The apparatus according to claim 6, wherein the occlusion detector is configured for detecting whether the unshared window occludes part or all of the shared window by detecting a position, size and Z-Order of each of the unshared window and the shared window on a screen.

12. A non-transitory, computer-readable storage medium tangibly embodying computer-executable program instructions which, when executed, causes a computer to perform a method, the method comprising:
   detecting that an unshared window occludes part of all of a shared window;
   in response to said detecting,
      (a) creating a first alpha blended image by making the unshared window semitransparent by an alpha blending operation, using a first value for the alpha factor; and
      (b) creating a second alpha blended image by making the unshared window semitransparent by an alpha blending operation, using a second value for the alpha factor; and
   restoring the occluded shared window by using the first and second alpha blended images by: multiplying first pixel values of first pixels in the first alpha blended image by the second alpha factor to generate a first product, multiplying second pixel values of second pixels in the second alpha blended image corresponding to the first pixels by the first alpha factor to generate a second product, and subtracting the second product from the first product to generate a first difference.

13. The computer-readable storage medium according to claim 12, wherein the method further comprises sending the restored shared window to a client so as to be shared.

14. The computer-readable storage medium according to claim 13, wherein the restored shared window is shared via a network.

15. The computer-readable storage medium according to claim 12, wherein detecting that the unshared window occludes at least part of the shared window includes detecting a position, size and Z-Order of each of the unshared window and the shared window on a screen.

16. The computer-readable storage medium according to claim 12, further comprising intercepting from a data stream to a display driver all the information needed for a display driver to execute the first and second alpha blended images.

* * * * *